(12) United States Patent
Lambertini (10) Patent No.: US 9,603,304 B2
(45) Date of Patent: Mar. 28, 2017

(54) MULTI-ROW CORN HEADER ROW UNIT (71) Applicant: Rubén José Lambertini, Pcia. de Córdoba (AR)

(72) Inventor: Rubén José Lambertini, Pcia. de Córdoba (AR)

(73) Assignee: CARLOS MAINERO & CIA S.A.I.C.F.I., Bell Ville Provincia de Córdoba (AR)

( * ) Notice: Subject to any disclaimer, the term of this patent is extended or adjusted under 35 U.S.C. 154(b) by 189 days.

(21) Appl. No.: 14/021,275

(22) Filed: Sep. 9, 2013

(65) Prior Publication Data
US 2015/0068179 A1   Mar. 12, 2015

(51) Int. Cl.
*A01D 45/02*   (2006.01)

(52) U.S. Cl.
CPC ................................ *A01D 45/021* (2013.01)

(58) Field of Classification Search
CPC .................................................. A01D 45/021
USPC ...................................................... 56/94, 119
See application file for complete search history.

(56) References Cited

U.S. PATENT DOCUMENTS

| | | | | |
|---|---|---|---|---|
| 2,471,771 A | * | 5/1949 | Parks et al. | 56/119 |
| 2,811,005 A | * | 10/1957 | Porath | 56/119 |
| 2,860,476 A | * | 11/1958 | Francis et al. | 56/119 |
| 2,989,834 A | * | 6/1961 | Pool et al. | 56/119 |
| 3,075,340 A | * | 1/1963 | Raney et al. | 56/104 |
| 3,352,093 A | * | 11/1967 | Procter | 56/98 |
| 3,919,830 A | * | 11/1975 | Gerber | A01D 43/082 56/119 |
| 4,112,654 A | * | 9/1978 | Picha | 56/98 |
| 4,291,523 A | * | 9/1981 | Cools | 56/94 |
| 4,337,612 A | * | 7/1982 | Dean | A01D 43/082 56/119 |
| 5,787,697 A | * | 8/1998 | Post | 56/119 |

* cited by examiner

*Primary Examiner* — Thomas B Will
*Assistant Examiner* — Mai Nguyen
(74) *Attorney, Agent, or Firm* — Egbert Law Offices, PLLC (57) ABSTRACT

A multi-row corn header row unit allows harvesting with a single corn header having fixed distance between rows, for instance at 525 mm, and multiple distancing between rows, for which purpose it bears trimmed or emptied snouts on its sides in lieu of conventional headers. Trimmed snouts tire used in combination with lifting sets or row units designed to form an opening with greater width than that of the stripping area, allows for contact with the plant in a manner such as to avoid rubbing on the most rigid part of the stem, thus preventing shakes, breaks or excessive tilting, which certainly determines the obtention of an effective harvest, upon obtaining ears without practically any waste. That is to say, the row unit allows that plants entering from outside of the central row of the collection unit reach the same without being cut, broken, shaken or tilted.

3 Claims, 6 Drawing Sheets

MULTI-ROW CORN HEADER ROW UNIT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to the agricultural machinery industry, and more specifically to the platforms or collecting headers of corn harvesters, and in particular refers to the collecting units or roller chain lifting sets or units of the corn header used for transporting or dragging harvested ears towards the typical processing devices existing following the collection header, That is to say, upon using a new set that allows harvesting corn planted at different distances between the rows, the invention achieves an effective harvest work in every type of field, regardless of the distance at which they were planted, without need to make modifications in the header equipment.

2. Description of Related Art Including Information Disclosed Under 37 CFR 1.97 and 37 CFR 1.98

In the field of agricultural activities, corn harvesting machines are well known, and comprise a corn collecting platform or header generally formed by a tubular chassis wherein a certain number of row or collection units are arranged at a distance such to make them coincide with the rows of corn plants in the field, so that there are as many row units in the header as rows intended to be simultaneously harvested.

In Argentina, the usual separation between rows of plants is 525 mm, for which headers of 7, 8, 9, 11, 13, 16 and 18 are produced, with rows arranged at such distance, and 700 mm, for which headers of 5, 6, 7, 8, 10, 12 and 14 are produced, with row units for this other distance.

Thus, in order to obtain a higher efficiency in the harvest, it is necessary to transform the header in use for a header that can also harvest at a distance between rows different from the distance for which it was originally built, i.e. it may be necessary to transform a header with a distancing for 525 mm, changing the distances of those row units to for instance 700 mm, also used in the current state of the art. It further requires that, in addition to moving the set of row units, conventional snouts and conventional hoods in use are to be changed for others suitable for the new required distance; generally, the equipment can be transformed for two different row distances, for instance, a header of 16 lines at 525 mm is currently transformable into one of 12 lines at 700 mm.

It should also be kept in mind that besides the difference in the mentioned row distances in the corn planting, it is possible that, depending on the field, in one same lot there are different distances between the lines, due to the fact that the field has been planted with a machine having a different number of rows to that of the rows of the header used for the harvest, and thus the planting machine has more or less rows than the header of the harvester, for instance, a corn field that was planted with a 13 row machine and is going to be harvested with a 18-row header.

Of course, this would cause a dephasing between the distances of different passes of the planter, and those corresponding to the passes to be made with the harvester since its header with its rows would also be dephased and, as a result, the distance between lines of the planter and the harvest would not coincide perfectly, as it should.

This is a serious matter in the state of the art, because it causes an ineffective operation of the harvest when the harvesting equipment works badly, causing evident unnecessary losses. As a result of the impact to the plant, this latter is tumbled, broken or shaken, which causes a loss of full ears, due to the fact that the plants do not match the passes defined by the conventional snouts, and thus the stem is not conveniently guided to the inside of the header through the opening between the snouts, and thus no ear is collected and they neither will be taken over the corresponding parts of the collection header, reason why they are not dragged for later processing, being lost, clearly affecting significantly the harvest's quality and efficiency.

BRIEF SUMMARY OF THE INVENTION

It is thus a purpose of the present invention to provide trimmed or emptied snouts, to obtain an effective corn harvest in a field that was previously planted making the harvest with a single multi-row corn collection header, configured at a distance between rows of, for instance, 525 mm, to harvest in rows with different distances between rows.

This can be achieved if snouts different from the conventional snouts are used, since, as it could be observed, conventional snouts do not allow an effective harvest tumbling, shaking or breaking the plant, avoiding the proper obtention of ears and thus leading to their loss, This may be achieved, as mentioned, by using a design of novel snouts trimmed or emptied on its sides in replacement of the conventional snouts described above.

In addition, in order to effectively achieve its purpose the present invention must be combined with the row units corresponding to the row unit specified in patent application P090105154, filed on 29 Dec. 2009, under the title "Lifting set for corn harvester headers". The row unit therein described is the row unit actually suitable to harvest optimally in this system.

It is yet another purpose of the present invention to offer a procedure for manufacturing trimmed or emptied snouts on its sides with the design mentioned above and the arrangement thereof on a single header having a fixed distancing between rows, for instance, at 525 mm.

BRIEF DESCRIPTION OF THE DRAWINGS

For the sake of clarity and understanding of its purpose, the present invention has been illustrated in several figures, wherein the invention has been depicted in its preferred embodiments, namely, but not limited to:

FIG. 2 shows the composition of the snouts in the existing state of the art in FIG. 2A, through a general view of the conventional snouts arranged on a header of such state of the art, wherein (4) indicates the original form of these snouts.

FIG. 3 shows in turn the composition of a snout trimmed or emptied on its sides.

DETAILED DESCRIPTION OF THE INVENTION

Figure 1:
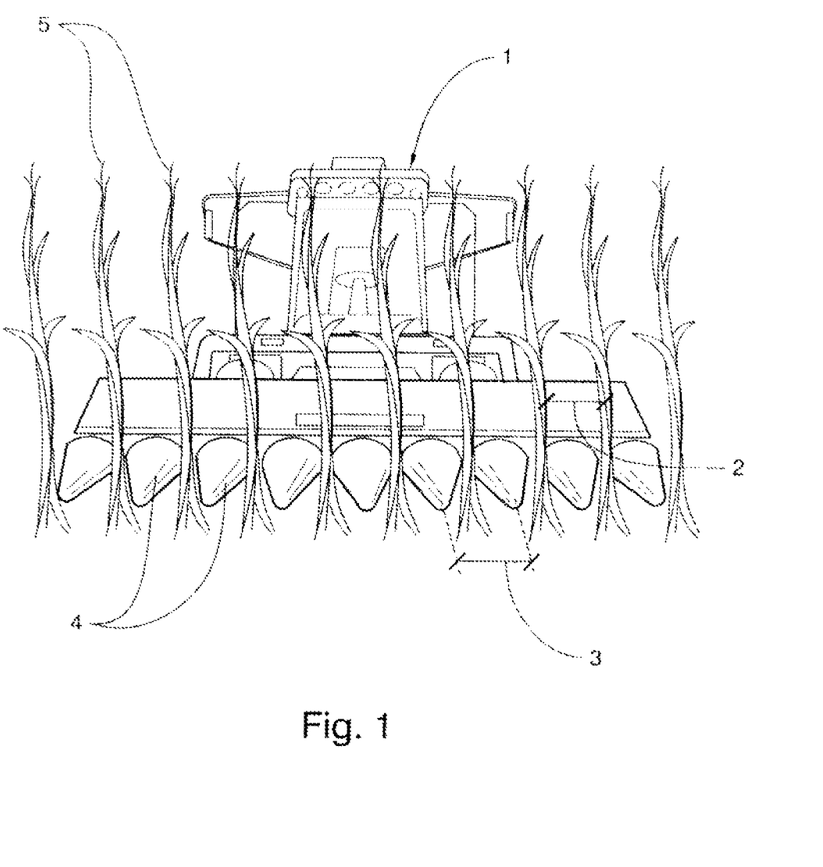
FIG. 1 is a view of a machine harvesting a field, wherein the distance between the rows of plants and the rows is compatible, so that the spaces between the snouts coincide with the rows of plants. For a better understanding, numbers (1) to (5) denote the references explained in the description.

Making now reference to FIG. 1, it can be observed how when harvesting a field a harvester (1) with a collection header having row units at distances equal to the distances between rows (2) will achieve that the rows remain at the mid spaces, among the distances existing between snouts (3), being in this case conventional snouts (4) existing in the prior art, as shown in FIG. 2. For a better understanding, in this FIG. 1, the number (5) indicates the location of the corn plants and their arrangement in the space (3) of the conventional snouts.

Figure 2A:
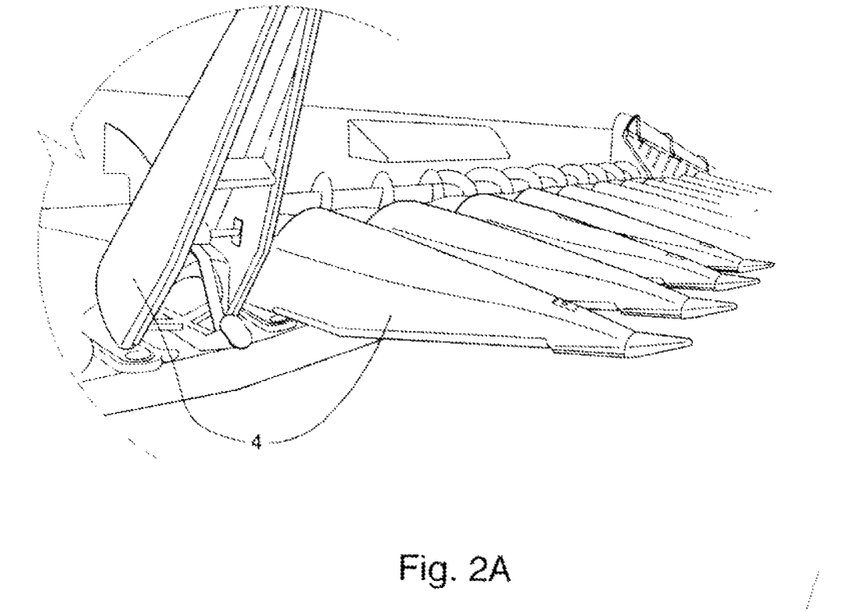

FIG. 2, and for better understanding the difference between conventional snouts of the state of the art and the trimmed snouts of the present invention, FIG. 2A, shows a general view of the arrangement thereof.

Figure 2B:
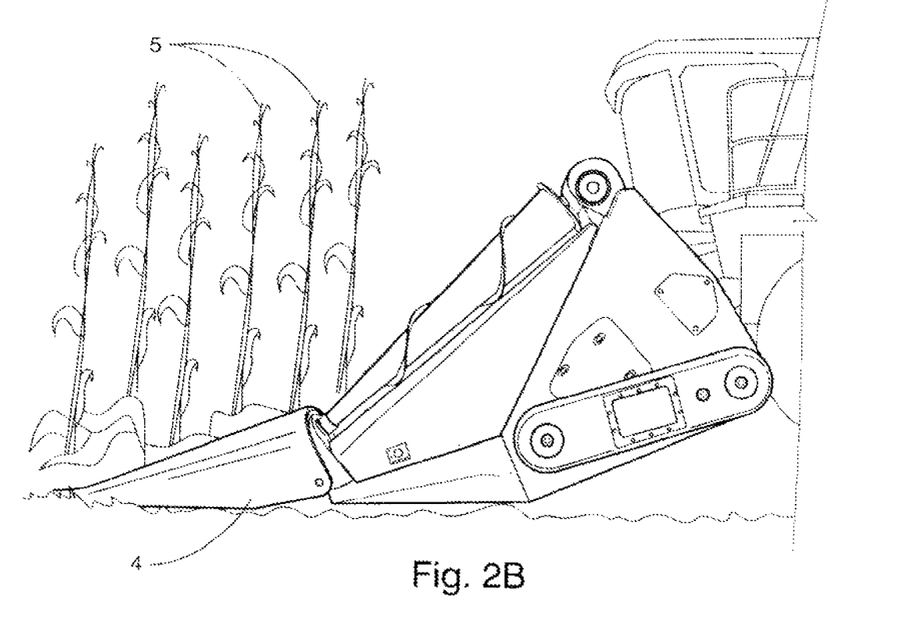
FIG. 2B shows a view of how a conventional snout contacts the ground, and it can be observed that it contacts the ground practically by resting on the ground with its bottom where (4) and (5) refer to the position of the snouts and their action over the plant.

Likewise, in order to have this difference in mind, FIG. 2B shows how these conventional snouts contact the ground, and upon doing so practically lay thereon, which determines that the stems entering from outside the center of the collection unit contact the same at ground level, for which reason they are more exposed to a higher tilting upon contacting the machine, resulting into a higher possibility that these stems be shaken, cut or broken upon rubbing the snouts on their more rigid and firm part that is its base, thereby achieving a greater loss of full ears, which is totally inconvenient in order to have an optimal harvest.

Figure 3A:
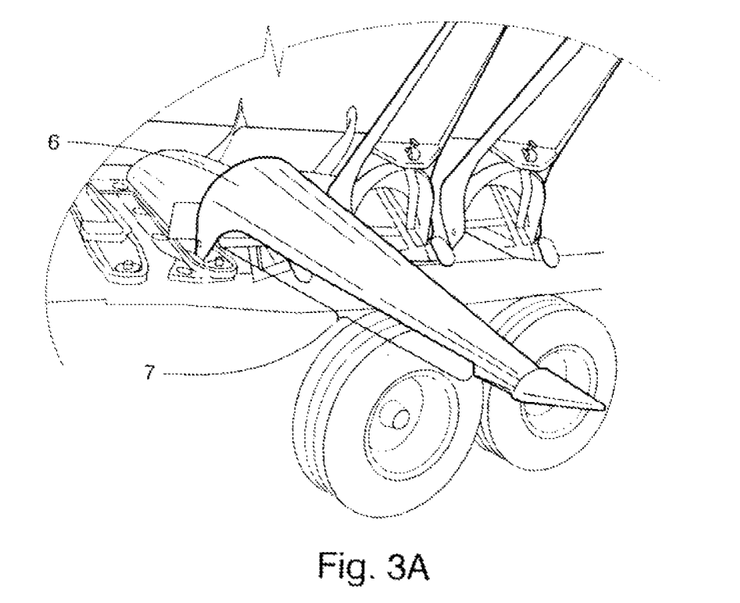
FIG. 3A is a specific view thereof, wherein (6) indicates the trimmed snout and (7) the form in which the trimming or emptying was conducted.

FIG. 3 shows an arrangement in specific form in FIG. 3A of the trimmed snouts, wherein (6) and (7) indicate the trimmed or emptied snouts and the side parts with the type of trimming or emptying made thereon, subject-matter of the present invention, to achieve a better performance in the corn harvest. To that effect this change to the conventional snouts must be combined, in order to obtain an effective production, with the lifting set or row unit used in the harvest of the corn planted in two rows pursuant to the description of patent application P090105154 already mentioned above.

Figure 3B:
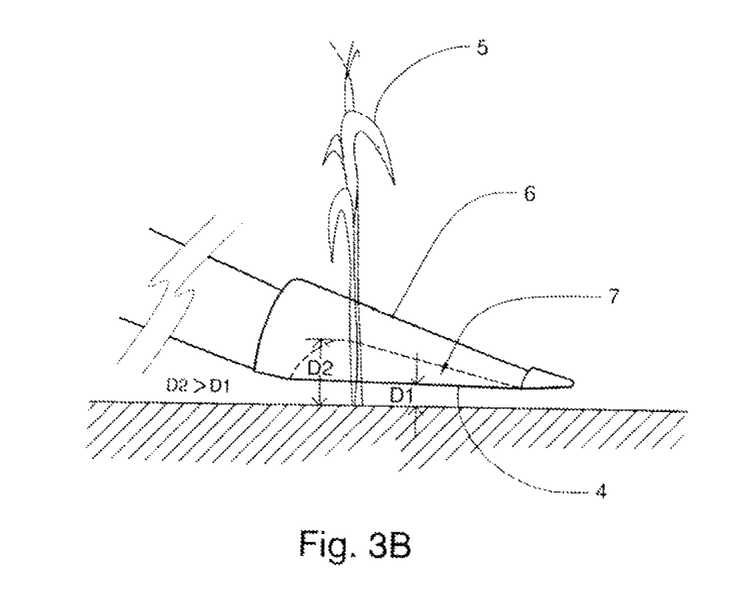
FIG. 3B shows a view of how a trimmed or emptied snout contacts the ground; in its composition, it can also be observed the difference existing between the trimmed (7) and the conventional (4) snout.

The above mentioned of attempting to obtain a better performance of the harvest with this modification (7) made to the conventional snouts (4) may be explained upon analyzing what is shown in FIG. 3B, which clearly shows the difference between the use of a conventional snout and the use of a trimmed snout proposed by the present invention, the distance against the ground of the conventional snout (4) which is (D1) practically of dragging on the ground, when instead the distance of the trimmed snout (6) is (D2) greater than the previous one, given that the emptied part of its sides (7) allows it to be in a position farther to the ground and therefore at a greater height, allowing this distance (D2), thus, affecting the corn plant at a distance higher than its base, for which reason the effects of the crash shall cause a lower tilting, shaking, etc., since when the contact is higher, the plant is less affected and thus the corn ear collection will be better, that is to say, it can be clearly observed how, upon being modified by means of a side cut to the snouts, these allow that the contact with the plant is made at a greater height, achieving a lower tilting of the plant, in addition to avoiding the rubbing on the base of the stem, that may cause the break thereof.

Figure 4:
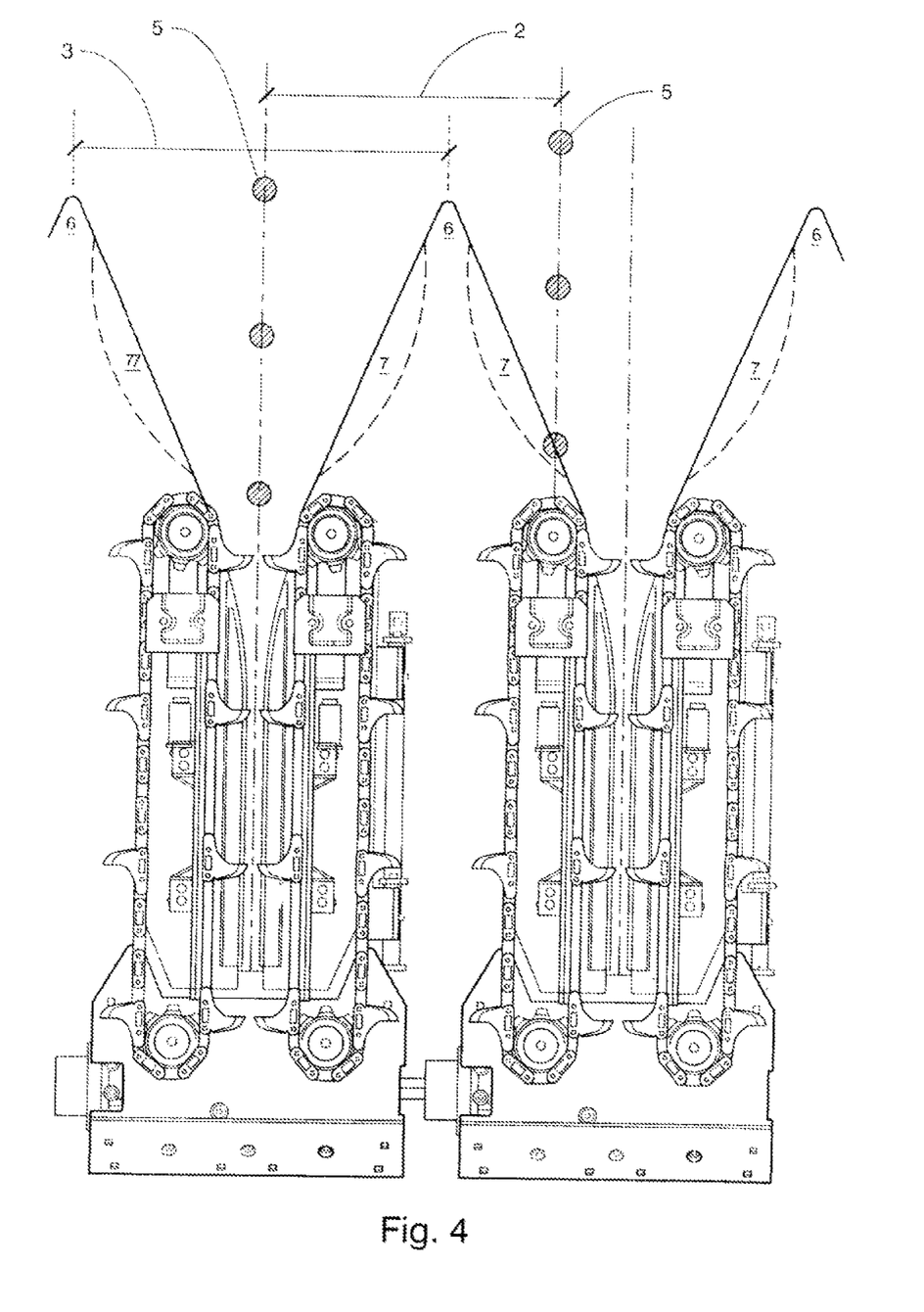
FIG. 4 shows a view as in a conventional row unit (2), in spite of the trimmed snouts (7), The plant to be harvested (5) contacts the gathering chain just at the height of the front gear, causing a front impact of the stem that is inconvenient for the corn harvest.

In order to understand the problem posed, even with this cut on a conventional row unit, FIG. 4 should be analyzed, which shows that upon using the trimmed snouts (6) with emptied parts (7) and running at an habitual or conventional distance between rows (2) among corn plants (5), the plant will contact the gathering chain just at the height of the front, sprocket, in which position the bucket or attachment has a tangential speed close to the double speed it has on its lineal trajectory, which causes hazardous shakes of the plants at distant areas from the stake rolls, in addition to loss of ears, this may create a front impact to the stem against the chain sprocket, causing its break, which shall be even more serious if it happens at a lower height.

Figure 5:
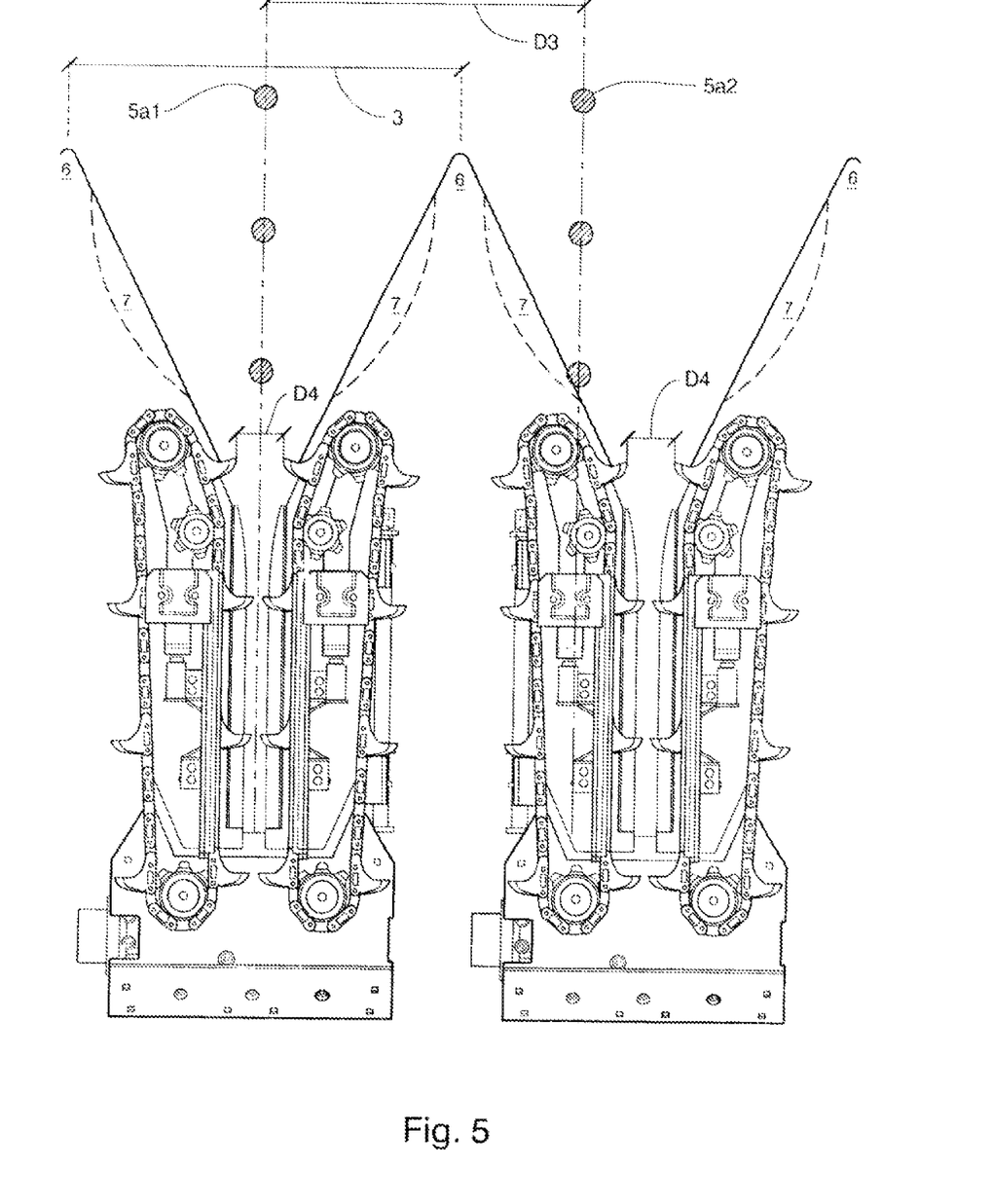
FIG. 5 shows a view as in a row unit corresponding to the one specified in P090105154 with trimmed snouts. The plants to harvest (5a) are not aligned in relation to the center of the collecting unit, a row (5a1) in the middle of the distance (3) and the other, though not in the middle (5a2), does not impact with the gathering chain, and thus reaches the pulling area without any front impact, thereby allowing a better corn harvest.

This can be solved through the use of the already mentioned row unit subject-matter of patent application P090105154, and that is used when plants are harvested in two rows, always in combination with the trimmed or side emptied snouts subject-matter of the present invention, since the corn is planted as shown in FIG. 5, wherein the distance between the side emptied snouts is (3), the plants (5a1) and (5a2), are on single row at a distance (D3), i.e, in the already known form, and the references (6) and (7) indicate the snouts modified by the present invention and how the trimming or side emptying is performed.

In addition, FIG. 5 shows that the distance between the gathering attachment close to crash with the plant (D4) is clearly bigger than that of the transport channel, because, as determined by application P090105154, the chassis of the row unit shows two parallel arms on each of which each gathering chain is mounted, wherein each arm has a front portion facing the plants, in this case (5a1) and (5a2), during the harvest, but where the front parts are tilted towards the outside, thus forming an opening or distance (D4) bigger than the width of the transport channel, thus the chains show a parallel stretch wherein the chains are parallel arranged along the transport channel, and another one tilted wherein the chains are tilted, far from another and therefore at such end the distance between the attachment is higher, as mentioned, allowing the plant (5a2) not to be crashed from its front but rather with the emptying of the snout (7), and the tilting of the front portion that determines the distance (D4) between the attachments, thus making that these plants that enter the central row of the row unit reach the same position without being cut, broken, shaken or tilted.

Having thus analyzed so far the necessary background to understand the subject-matter of the present invention, it is worth analyzing how it is established the novelty in harvesting optimally with a single header whose distancing between rows is fixed, for instance, at a distance of 525 mm and having to harvest multi-distancing between the plantation rows.

It is now necessary to analyze how this combination of headers with side empty snouts and the above-mentioned row unit claimed in patent application P090105154 mentioned above, allow an optimization in the harvest. As it can be observed in FIG. 5, the plants are misaligned in relation to the row unit center, reaching the stripping area without shaken, thus avoiding every risk thereby implied given that the plant contacts the gathering chain at an area where it describes a lineal stretch, and therefore once it reaches the center of the stripping area, the curve described is minimal and immediately taken by the stack rolls.

For a better understanding, this figure contains references, as the distance between snouts (3), (5a1) and (5a2), the incoming plants in a simple row that will be taken by the stalk roll, wherein (D3) is the distance between them, and (6) and (7) are the side empty snouts and the part of the emptied cut that allows reaching the subject-matter of the present invention. It can also be observed that the plant (5a1) is just in the mid-space, between the side empty snouts and the plant (5a2) is misaligned but without the possibility of crashing the gathering chain, but, as described, shall contact the same properly, and so will happen with the other rows of plants in the lines.

That is to say, that the side empty snout contacts the stem or corn stalk at a higher point in rows that enter outside of the central row of the collection unit. This will allow achieving several essential aspects for the present invention, such as significantly reducing the plant's tilting upon the contact, avoiding the friction on the most rigid and firm part of the stem that may cause its break and therefore loss of full ears, in addition to favoring the soft sliding thereof, which avoids inconvenient shakes with possible loss of ears. This also causes an unnecessary wear of the snout, which determines a greater useful life of it and the existence of lower power consumption.

That is to say, it allows the plants that enter outside of the central line of the collection unit to reach the same without being cut, broken, shaken or tilted, which determines the indubitable optimization of the corn harvest.

So far, we thoroughly analyzed the convenience of a modification of the conventional snouts in novel trimmed or side emptied snouts for the harvest, specially the significance gained by this modification for its combination with the row unit set specified in patent application P090105154 already mentioned, although it has not been analyzed how this could favorably influence upon trying to harvest with a single header having a fixed row distancing at, for instance, 525 mm, on multiple distancing between lines.

Figure 6:
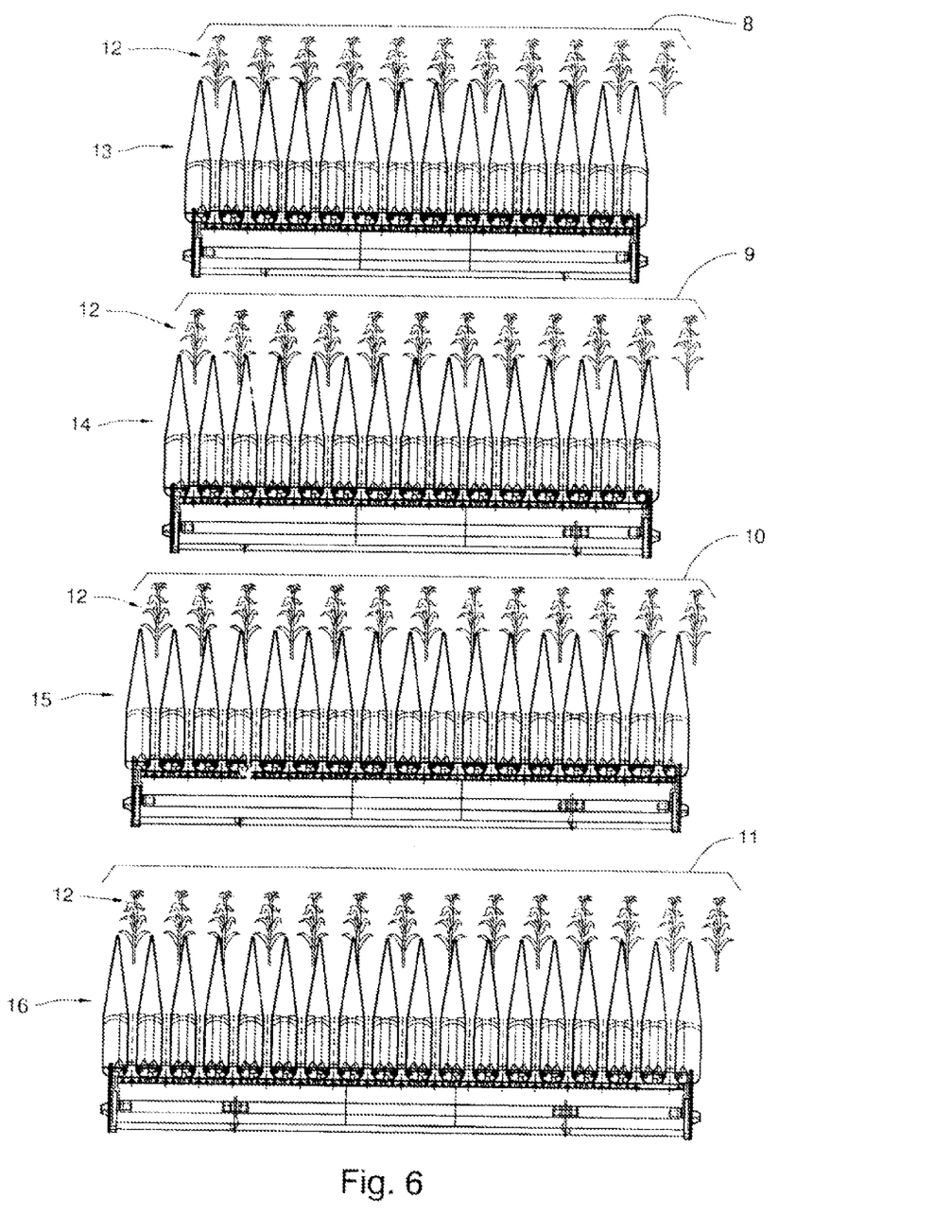
FIG. 6 shows a view of some possible combinations among header equipment with rows at a distance apart of 525 mm with corn plants planted in the field at a distance apart of 700 mm.

FIG. 6 analyzes, by way of example, the operation of the present invention for plant separation at a distance of 700 mm between line of plant (12). This distance was selected for being habitual in the state of the art, and taking headers with different options as those indicated in the figure, (13) for 13 rows of 525 mm, (14) for 14 rows of 525 mm, (15) for 16 rows of 525 mm, and (16) for 17 rows of 525 mm, and wherein it is also analyzed the results of harvest with the first option (13) on 11 lines of plants (8), the second (14) with 12 lines (9), the third (15) with 13 (10), and the fourth (16) with 14 lines (11).

By analyzing the possibility of the first option (13), for a group of 11 lines, it is observed that the first plant will be exactly in the middle of the separation between the snouts, for which reason the harvest is performed like in the prior art, without any loss of ears. However, the following two plants shall be taken from the side of the snouts, and thus acting the emptied part thereof, as previously described, which will allow obtaining a better possible harvest with less loss of ears, and likewise will alternatively occur until reaching plant No. 10 of the group, since in plant No. 11 this option (13) cannot act due to the fact that the last line is not reached.

In the second option (14) we see that also plant No. 11 of the row can be reached, i.e. with 1 more row on the header we can increase a further row in the harvest.

It can likewise be observed that by increasing the header to 16 rows at 525 mm, the harvest can be extended to 13 rows, but when taking the header to 17 rows, although the number of rows does not increase but remains in 13, the last plant will be in the middle of the distance between snouts, for which reason its harvest shall suffer no loss, thus improving its yield.

Therefore, it can be analyzed that in addition to the improvement in the corn harvest, that determines the novel modification of the side emptying of the snouts at the headers, its composition according to a single header with a fixed distancing between lines of, as in the present example, 525 mm with different number of rows options, its combination with the use of the row units as those described in patent application P090105154, and the planting distances of the field, in this case 700 mm, results in obtaining a true optimization in the corn harvest upon causing it to be performed with a total concept of multi-rows.

Of course that analyzed for a 700 mm distancing, it can be used for other distancing, for instance, for 420 mm distancing between rows, for the first option (13), the plants group row will have 17 lines, 4 plants shall be in the middle distance between the snouts and 13 will be on the sides and shall be driven by the side-empty snouts. For the second option (14) there will be 4 in the middle and 18 lines on the sides, on the third option (15) there will be 20 plants, 4 in the middle and 16 on the sides, achieving a better yield for the fourth option (16) where there will be 22 lines on the sides and 5 plants in the middle, i.e. for this situation, the yield is much higher to the yield obtained in the planting at 700 mm between rows.

The yield analyzed for the example of 700 mm is more or less kept for a planting of up to 900 mm between rows where on the ends the snouts cannot act on any plant, but the harvest levels are somehow less, though close to those already seen.

In turn, in a planting at 1500 mm, the option (13) shall only have 1 plant in the middle and 4 on the sides, there remaining 5 snouts non-operating: This yield improves upon increasing to 17 row units 525 mm per header, where 1 plant will stay in the middle and 5 plants on the sides, but 6 snouts will not act with any plant; upon increasing the row plant distance to 2100 mm, there will be less plants to harvest: 4 for option (13) and 5 for option (16), but all of them with a fully efficient harvest as a result of being in the middle of the distance between the snouts, although in this case not all the snouts will run, since in the first case over 14 snouts 6 will not act and in the second, on 17 snouts, 8 will not run.

Likewise, where these examples combine sets of the corn header with side trimmed snout in combination with the row units or lifting sets analyzed on patent application P090105154, which have plantings at different distances apart, show that effectively one single header with a fixed distancing between rows, as in the example herein illustrated in FIG. 6, with a distance of 525 mm, can operate in multiple distances between lines with high yield in the harvest without need of having to arrange a different header for each case and adapted for every situation, which will surely allow a better efficiency, optimum harvest yield and mainly a great economy on the use of the available resources.

It can also be considered that the side trimming or emptying of the snouts on the corn header containing them must be modified to overcome the problem in the prior art, the design of the type and measure of the trimming or emptying to be made must be done and how the header should be inserted for a fixed distancing between rows to, as in the present case 525 mm or any other necessary, to achieve a multi-distancing between lines, which design requires a procedure consisting on manufacturing the new trimmed snouts and their insertion into the header to form the row unit of the multi-row corn header subject-matter of the present invention.

This manufacture is achieved upon developing the mentioned design, doing as necessary to obtain the new trimmed snouts on its sides and being inserted into the suitable corn header, allowing, with a suitable effort, to achieve the efficient and effective use of the system upon combining it with the lifting sets or row units already mentioned.

As it may be observed from the foregoing description, the present invention provides a novel form of harvesting with a single corn header with fixed distancing between rows, in this example, at 525 mm, with the option of setting another distance, with multiple distancing between rows, which is achieved by a combination of trimmed or emptied snouts on its sides and the lifting sets or row units already disclosed in patent application P090105154, without causing damages or losses in production.

In addition, it provides for a procedure for the manufacture of the trimmed snouts and the arrangement thereof on the corn headers, furnishing them.

I claim:

1. A corn harvesting head for a corn harvester having a wheel at a forward end thereof, the corn harvesting head for processing a plant, the corn harvesting head comprising:
a plurality of snouts in spaced relation to each other, said plurality of snouts positioned forward of the wheel at the forward portion of the corn harvester, each of said plurality of snouts having a forward portion and a rearward portion and a first side extending between said forward and rearward portions and a second side extending between said forward and rearward portions, said forward portion having a bottommost edge, said rearward portion having a bottommost edge, each of said first side and said second side having a cut-out area opening at a bottom thereof, said cut-out area defining a lower edge of the sides such that said lower edge is at a level higher than a level of said bottommost edge of said forward portion and also at a level higher than a level of said bottommost edge of said rearward portion, said lower edge of the side extending upwardly at an angle from said bottommost edge of said forward portion so as to reach a maximum height above the level of said bottommost edge of said forward portion, said lower edge of the side extending downward from the maximum height toward the bottommost edge of said rearward portion, whereby when said snout is arranged with an adjacent snout any plant entering a space therebetween along a line that is not centralized between the snouts the plant contacts one of the snouts such that the plant will contact the snout along said lower edge of the side and at a height of the plant that is higher than the base of the plant.

2. The corn harvesting head of claim 1, wherein said snout houses at least one gathering chain at each of the sides of the snout, said at least one gathering chain extending along the side of the snout and has a front section that directs into said snout.

3. The corn harvesting head of claim 2, the gathering chain being mounted upon sprockets so as to form a loop, the gathering chain having buckets to convey the plant, the gathering chain having a section running along the side of said snout such that the gathering chain will run parallel to a corresponding chain of the adjacent snout, the gathering chain having a front inclined section extending inwardly, the first inclined section of the gathering chain facing an inclined section of the corresponding chain so as to define a broad opening that prevents an impact of the plant against the bucket of the gathering chain.

* * * * *